Figure 6:
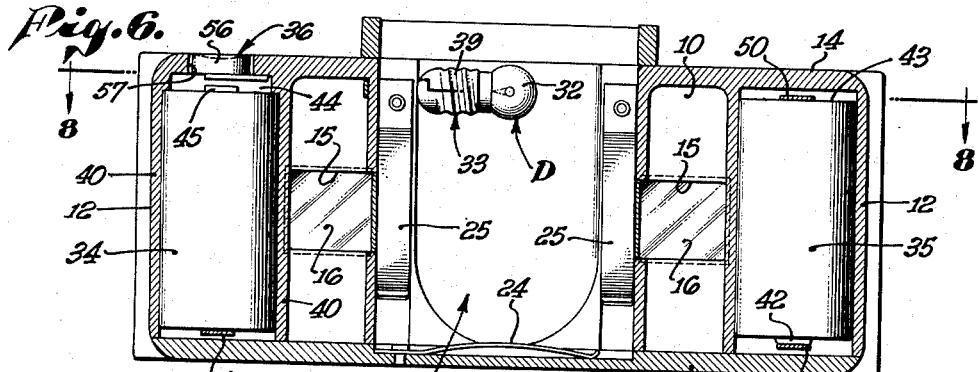

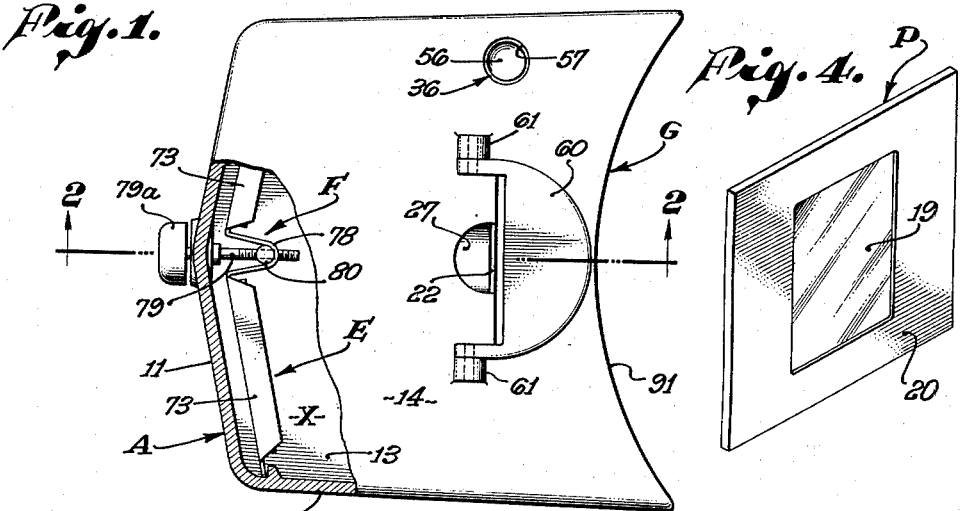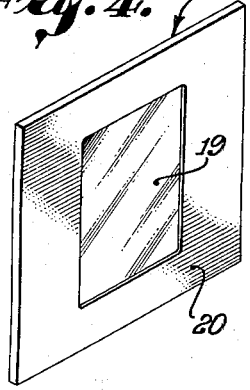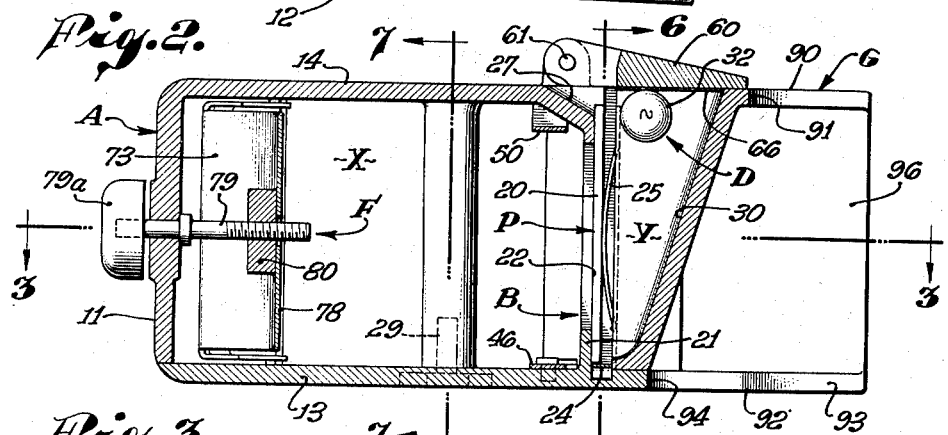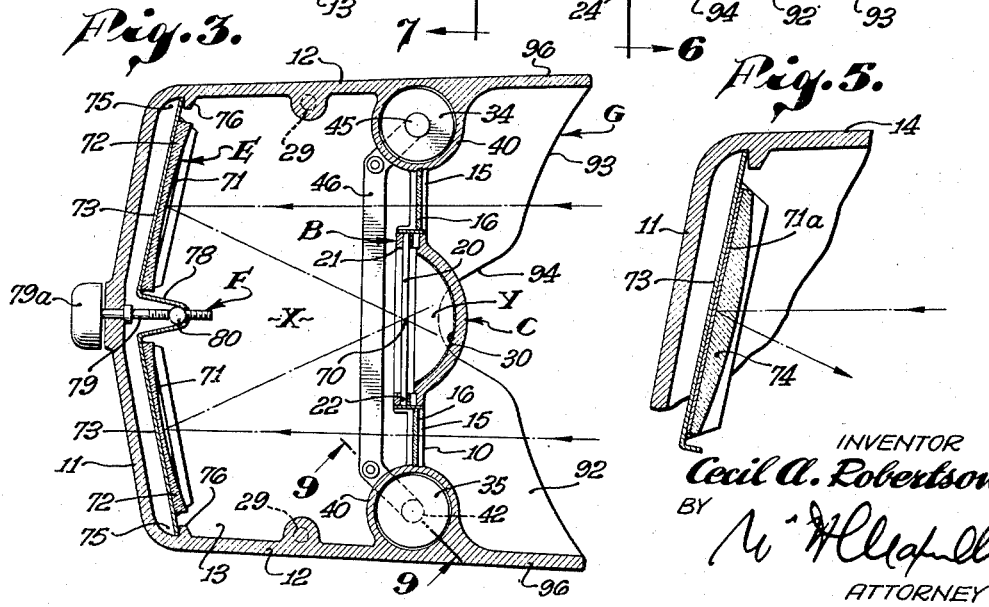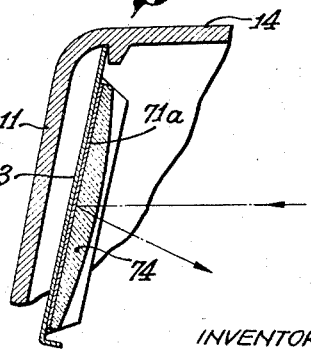

Aug. 29, 1950  C. A. ROBERTSON  2,520,432
VIEWER FOR TRANSPARENT PICTURES
Filed June 9, 1947  2 Sheets-Sheet 2

INVENTOR
Cecil A. Robertson
BY
ATTORNEY

Patented Aug. 29, 1950

2,520,432

UNITED STATES PATENT OFFICE 2,520,432

VIEWER FOR TRANSPARENT PICTURES

Cecil A. Robertson, Glendale, Calif.

Application June 9, 1947, Serial No. 753,471

1 Claim. (Cl. 88—1)

This invention has to do with a viewer for transparent pictures, it being a general object of the invention to provide a simple, practical, compact device useful for viewing transparent pictures such as photographs in the nature of slides.

My present invention is concerned with that general class of viewing device wherein the user employs both eyes to see a single object or image, such as a picture, and wherein the object or picture is preferably a transparency or transparent film. The device of the present invention is particularly practical for handling ordinary or common photographs or photographic transparencies in the nature of slides, which photographs are of common or standard form and are so small as to ordinarily require magnification for satisfactory viewing.

Viewing devices ordinarily employed for handling pictures or transparencies such as I have referred to generally involve ocular lenses or eye pieces, and generally have certain disagreeable characteristics. For example, one common arrangement locates lenses in front of the eyes of the user and the picture beyond the lenses with a light transmitter beyond the picture. If ocular lenses are not employed in such an arrangement the length of the devices is excessive. Under the most favorable circumstances the light transmitting means is a translucent element or screen that acts to cut out an appreciable amount of light.

It is a general object of my present invention to provide a viewing device of the general type referred to involving a very simple yet practical optical system, the system being such that curvature of field due to the reflectors employed is cancelled out and the slight billowing effect that is produced is away from the eye rather than toward the eye, as in the case where an ocular lens is used. Further, the system that I have provided does not generate ghost images to reduce clarity and there is no chromatic aberration.

It is a general object of my present invention to provide a viewer of the general character referred to which is of simple, compact form and construction. The viewer that I have provided is of the binocular type wherein the user views a single picture using both eyes. By my invention I provide a viewer for viewing a single picture with both eyes without employing ocular lenses, and yet the overall size of the structure is limited, making the device small, light, and convenient for general use.

It is a further object of the invention to provide a device of the general character referred to wherein the light handling parts are all located so that they are not exposed to be contacted by the fingers of the user in a manner to be impaired. In the preferred form of my invention the optical system involves a single illuminating reflector and a pair of viewing reflectors and all of the reflectors may be front surface reflectors with the result that the device is highly efficient and does not have its efficiency cut down by the transmission of light through the lenses or other such elements.

Another general object of the present invention is to provide a viewer of the general character referred to in which the picture to be viewed may be placed in the viewer in a normal or upright position to be seen or viewed correctly by the user, there being no reversal of image or other confusing optical phenomena. By my invention I have provided a viewer in which the entire field of view of the transparency is unobstructed, and it is to be noted in this connection that the transparency being viewed is enlarged or magnified to a larger size than is common to the ordinary types of viewers in general use.

It is another object of the invention to provide a viewer of the general character referred to which is of simple, inexpensive construction. The device that I have provided involves few simple parts and it involves no complicated or expensive parts such as lenses or other like elements.

It is an object of the present invention to provide a viewer which does not require housing. I have provided means whereby the optical system is easily adjusted to the inter-ocular distance between the eyes of the user.

It is a further object of my present invention to provide a viewer of the general character referred to wherein the optical system is such that the user looks straight forward in a substantially natural manner to see the reflections of the single image or picture, the reflectors being so located as to bring the images together so that they are viewed as one. In the optical system that I have provided the viewing reflectors are pitched so that the lines of vision from the eyes of the user come together at a single focal point coincidental with the plane of the picture being viewed.

It is another object of the invention to provide a viewer of the general character referred to wherein the illuminating means is of simple practical form and is such as to illuminate the picture in a most efficient manner and so that the illumination is substantially uniform.

Figure 7:
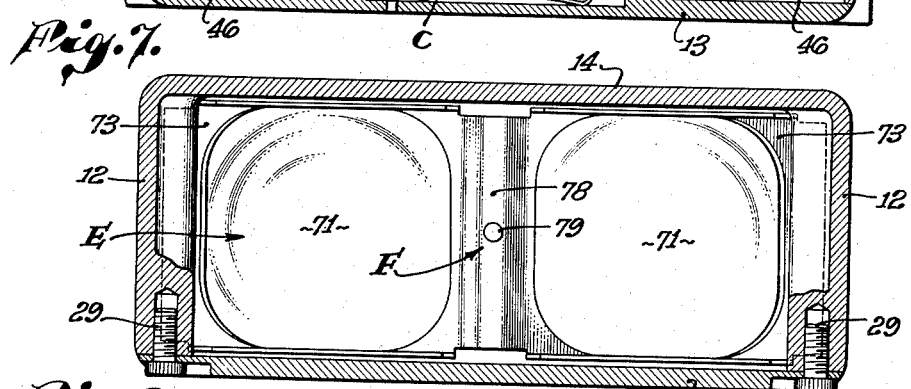
Figure 8:
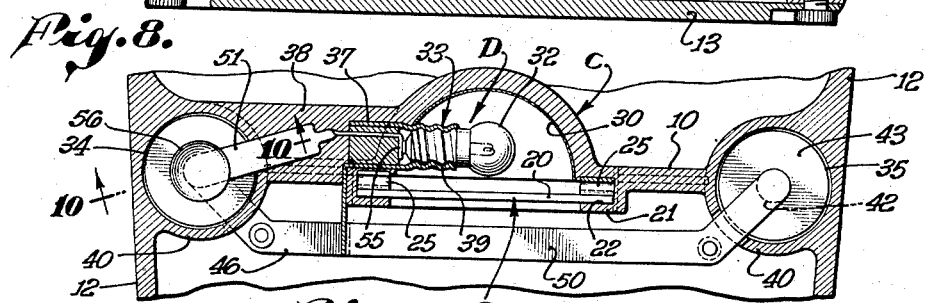
Figures 9, 10, 11:
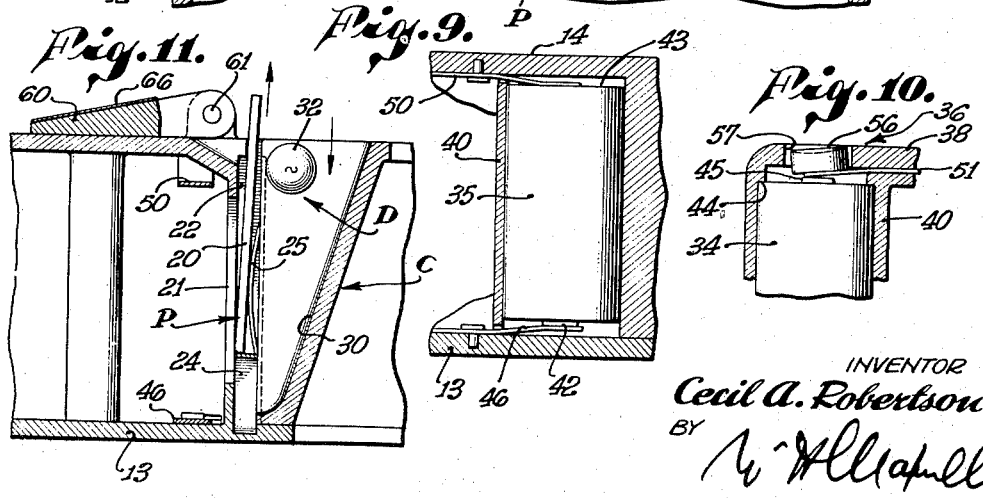

The various objects and features of my invention will be fully understood from the following detailed description of typical preferred forms and applications of the invention, throughout which description reference is made to the accompanying drawings, in which:

Fig. 1 is a top plan view of the viewer that I have provided showing a portion of the body broken away to illustrate parts within the body. Fig. 2 is an enlarged longitudinal sectional view of the viewer being a view taken as indicated by line 2—2 on Fig. 1. Fig. 3 is a reduced plan section of the viewer being a view taken substantially as indicated by line 3—3 on Fig. 2. Fig. 4 is a perspective view of a picture such as may be used in the viewer. Fig. 5 is an enlarged detailed view of a portion of a viewer showing a modified form of viewing reflector that may be used, being an enlarged view corresponding to a portion of the structure shown in Fig. 3. Fig. 6 is a transverse sectional view of the structure shown in Fig. 2, being a view taken as indicated by line 6—6 on Fig. 2. Fig. 7 is a transverse sectional view of the structure shown in Fig. 2 being a view taken as indicated by line 7—7 on Fig. 2. Fig. 8 is a plan section taken as indicated by line 8—8 on Fig. 6. Fig. 9 is an enlarged detailed view taken as indicated by line 9—9 on Fig. 3. Fig. 10 is an enlarged view taken as indicated by line 10—10 on Fig. 8, and Fig. 11 is an enlarged view similar to a portion of Fig. 2, showing the closure for the illuminating means open and illustrating a picture in course of being removed from the viewer.

The viewer that I have provided involves, generally, a body A, mounting means B for a slide or picture P, illuminating means C, an illuminating means D supplementing the illuminating means C to be used with or in place of means C, viewing reflectors E, adjusting means F for the reflectors E, and an eye shield G carried by and projecting from the body A.

The body A is a box-like unit defining what I will term a closed viewing chamber X and in its simple form as shown in the drawings it involves, generally, a front wall 10, a back wall 11, side walls 12, a bottom 13 and a top 14. One part of the body, preferably the bottom 13, is detachable from the other parts. The front wall is the portion of the body A arranged toward the face of the user and it is characterized by spaced eye openings or windows 15. The windows 15 are laterally spaced, as shown throughout the drawings and they are of such size and shape that the user of the device sees through both of them simultaneously when using the device. In practice I may provide clear transparent closures 16 for the window openings 15 primarily to shield the interior of the device against dirt or dust.

The mounting means B for the picture P is located at the front wall 10 of the body and in accordance with my arrangement of parts the mounting means B is located between the window openings 15. The mounting B includes an opening in the body A which enters the body from the top 14 and extends down in or through the front wall 10 between the windows 15 to a point at or close to the bottom 13. The mounting means B is such as to accommodate the particular pictures to be handled by the device. For purpose of example I will refer to the device as handling an ordinary transparent picture P such as a photographic transparency in the form of a slide. In Fig. 4 I have shown a common form of such picture involving a simple, rectangular, flat frame 20 of cardboard, or the like, supporting the picture or transparency 19 as clearly shown in Fig. 4.

When this particular form of picture is to be handled the mounting means B preferably includes vertical guideways at the vertical edges of the opening provided in the wall 10 to accommodate the picture P. In the preferred form of the invention the guide construction involves vertical guide flanges 21, the front sides of which are recessed at 22 to accommodate the frame 20 of picture P. A suitable ejector in the form of a leaf spring 24 is located at the bottom of the guide means so that as the picture P is arranged in place therein the lower edge of the picture frame strikes the spring 24 and the spring 24 is somewhat compressed when the picture is in position to enter the recess 22.

The means B further includes one or more retainer springs 25 which may be leaf springs arranged to engage the frame 20 and urge it toward the flanges 21 so that when the frame 20 is moved into register with the recesses 22 in the flanges against the resistance of spring 24 it is pressed into place in the recess, and is yieldingly held there as the device is used.

A finger channel 27 is provided in the upper portion of the body making the upper edge portion of the picture frame 20 accessible to the user when the picture is in place in the recess 22, so that the upper edge portion of the picture can be deflected from the recesses 22 to a position where the spring 24 serves to eject the picture far enough to be accessible for removal as shown in Fig. 11 of the drawings.

The back wall 11 of the body may be of any suitable form or shape and in the form of the invention that I have illustrated it serves only to close the back of the body and as a support for a part of the means F as will be hereinafter described.

The side walls 12 of the body may be plain simple parts closing the sides of the body and the top 14 of the body may be a simple flat element closing the top of the body and free of structural features except to the extent that I herein describe.

The bottom 13 of the body is preferably a removable part or panel forming a closure for the body and serving in connection with other elements as herein described. In the particular case illustrated the bottom 13 is a simple flat panel-like part releasably secured in place by suitable recessed fasteners such as screws 29.

The illuminating reflector C is carried by the front wall 10 of the body A adjacent and in register with the means B carrying a picture P. The reflector C may be a shell-shaped part integral with the wall 10 and having a concave inner reflective surface 30 serving to direct light onto or through the picture P. In its preferred form the reflector C is inclined or pitched so that it extends upwardly and forward or toward the user when the device is in service, with the result that it defines a light chamber Y behind or adjacent the picture P. The large top or upper end of the light chamber Y is open and is such that when external light, as for instance, sunlight, is being used to illuminate the picture P the light is admitted into the chamber Y through the open top thereof to fall upon the concave reflective surface 30 to be directed thereby onto or through the picture in the mounting B. In practice I may finish, coat, or otherwise provide the surface 30 of reflector C so that it is effective in directing light to or through the picture.

I have found it advantageous to make the face 30 such as to somewhat diffuse the light handled thereby.

The illuminating means D is such that it may be used in place of or together with the means C. In the case illustrated I have shown the illuminating means as involving, generally, a lamp 32 carried by a socket 33 to be energized from batteries 34 and 35 under control of a switch 36. The socket 33 has a base end 37 carried by the wall 10, for instance embedded in a boss-like part 38 of the wall 10. A threaded outer or projecting portion 39 of the socket carries the lamp 32 so that it is located in the central upper portion of the light chamber Y.

In the particular arrangement illustrated I provide two batteries 34 and 35 for energizing the lamp 32 and in accordance with my preferred arrangement the batteries are carried in cases 40 located at the corners of the body between the wall 10 and the sides 12. It is to be noted that I have located the lamp 32 so that only one lamp is required, thereby economizing upon the electrical energy taken from the batteries. I prefer to employ ordinary conventional dry cells for the batteries 34 and 35 and in accordance with my preferred arrangement the battery 35 is arranged in its carrying case 40 so that its central end terminal 42 projects downwardly. The bottom or closed end 43 of the battery 35 faces upwardly. The battery 34 is arranged in its supporting case 40 so that it faces up or has its central end terminal 45 at its upper end, the upper end of the battery being stopped against a seat 44 in the upper end of the case 40. A bus bar 46 is carried by the bottom 13 of the body A so that it has one end in contact engagement with the terminal 42 of battery 35 while its other end is in contact with the case of battery 34 at the closed end thereof. When the bottom 13 is removed the batteries may be readily placed in or removed from the cases 40.

A lead 50 engages the case of battery 35 at the closed end 43 thereof and extends to the base portion 37 of the socket 33 establishing contact between the shell of the socket and the case of battery 35. A lead 51 is carried by the body, preferably by the boss portion 38 thereof, to extend into the base portion of the socket without making contact therewith so that its end 55 forms a center contact in the socket. The lead 51 has a projecting free flexible end overlying the central terminal 45 of battery 34 and normally out of engagement therewith. A push button 56 is suitably mounted in an opening 57 in the top 14 of body A so that it is accessible to the user of the device and when depressed it serves to operate the switch 36 by deflecting the lead 51 into contact with the terminal 45 of battery 34. The button is preferably flush with the top of the body. When the lead 51 contacts the terminal 45 of battery 34 the circuit is closed to the lamp 32.

The illuminating means may further include a closure for the light chamber Y. In the particular case illustrated I have shown a closure 60 pivotally carried by ears 61 on the top of the body. When the illuminating means D is not in use the closure 60 may be swung back or to an open position, as shown in Fig. 11, and it may be arranged to remain in this position when pictures are being arranged in or removed from the mounting means B. When the lamp 32 of the means D is energized to illuminate the picture P the closure 60 may be arranged in operating position as shown in Fig. 2, so that it confines light to the light chamber Y. It will be understood that the inner side 66 of the closure 60 may be made reflective so that it handles light in a most efficient manner.

The viewing reflectors E are like oppositely pitched reflectors at the inner side of the back wall 11 of body A in the line of vision of a person looking through the windows 15. The two reflectors are pitched or faced somewhat inwardly or toward each other so that the lines of view of the user as he looks through the windows 15 are reflected by the reflectors E and intersect at a common focal point 70 coincidental with the plane of the picture 19 in frame 20.

In accordance with the broader principles of my invention the reflectors E may vary widely in form and construction. However, I prefer that they be front surface reflectors each having a front reflective surface 71 and in order to gain desirable magnification I prefer that the reflective surfaces 71 be somewhat concave. In practice slight curvature will give the desired magnification and in such case the spherical aberration due to the curvature will be negligible. It is to be noted that in this form of my invention it is only necessary to finish the one surface of the reflector and this may be a spherical surface, which type of surface is most economically ground, polished, and otherwise finished. In practice each reflector may involve a body 72 of glass or the like, the front surface 71 of which is suitably shaped and is finished or polished to have the desired reflective action. The bodies 72 of the reflectors may be mounted on or carried by plates 73 by which the reflectors are mounted in the body A.

The adjusting means F which I have provided for the means E is operable to vary the pitch or angular setting of the reflectors E to compensate for the difference in interocular distance between the eyes of different users. In the preferred form of the invention the mounting plates 73 of the reflectors E project to the sides 12 of the body A where they are supported in notches 75 formed by lugs 76 projecting from the inner faces of the sides 12. The outer edges of the plates 73 bear in the notches 75 so that the plates may pivot or tilt about the vertical axes located where the plates engage the sides 12. The inner or opposed end portions of the plates 73 are joined by a flexible loop or connector portion 78 and an operating screw 79 is rotatably carried by the back wall 11 of the body A and operates a nut 80 which bears against the connecting portion 78. An operating head 79a is provided on the outer end of the screw at the exterior of the body.

The two plates 73 and the connecting portion 78 may be one continuous sheet of metal, or the like, shaped and proportioned so that the connecting portion 78 normally bears toward the back 11. The screw 79 is operated so that the nut 80 threaded on the screw bears against the connecting portion 78 holding it the desired distance away from the back 11. With this construction the operator can by slight rotation of the screw 79 vary the pitch or angular setting of the reflectors E to compensate for or to adjust the reflectors to the spacing of the eyes. When the reflectors are adjusted they swing or pivot about the vertical axis or lines of support located where the outer ends or edges of the plates bear on the sides of the body.

The eye shield G that I have provided projects from the front end portion of the body A or from the end of the body which opposes the face of the user. The particular shield illustrated involves an upper visor member 90 which is in effect a continuation of the top 14 of body A and which has a concave edge 91 designed to conform to the forehead of the user immediately above the eyes. The shield also involves a lower nose shield 92 which may be, in effect, a continuation of the bottom 13 of the body A and which has curved edge portions 93 to conform to the cheeks of the user and a central notch 94 to accommodate the nose of the user. Side pieces 96 may extend between the side edges of the visor 90 and the nose piece 92 to prevent light from entering at the sides of the structure.

In Fig. 5 I show a modified form of reflector wherein the reflective element may be a coating, sheet or other means 71a on the face of the supporting plate 73 or on the back face of a lens. The magnification in this case is gained not by employing a concave front surface reflector but by using a flat reflector and by providing a suitable lens element 74 on the front of or over the reflector. In this case the body of glass forming the lens has a convex front face and the back face which is flat may be silvered or otherwise made highly reflective.

In using the device of the present invention the slide or picture P is arranged in the mounting means B in the manner hereinabove described. As the picture is inserted the ejector spring 24 is compressed and during operation the springs 25 hold the picture firmly seated in the recess 22 of the mounting means. If light is to be admitted through the open top of chamber Y to be reflected by surface 30 the closure 60 is opened. However, if light is to be generated by the means D then it may be desired to close the closure 60 to the position shown in Fig. 2. The closure may be left in either position without interfering with the insertion or removal of the pictures. To view the picture the operator depresses the button 56 closing the circuit to the lamp 32. Light from the lamp is reflected by the surface 30 to shine through the picture and images of the picture are reflected by the reflectors E so that the user sees but a single image employing both eyes for this purpose.

The interior of the body may be darkened or provided with a dull dark finish so that there is no stray light in the body to interfere with clear vision of the pictures. It will be apparent that through simple rotation of the screw 79 the reflectors E can be readily brought into perfect adjustment.

Having described only typical preferred forms and applications of my invention, I do not wish to be limited or restricted to the specific details herein set forth, but wish to reserve to myself any variations or modifications that may appear to those skilled in the art and fall within the scope of the following claims:

Having described my invention, I claim:

A viewing device including, a box-like body having substantially flat parallel top and bottom walls and front and rear walls with laterally spaced eye openings in the front wall, a slide mounting at the front wall between the eye openings having vertical guides supporting a slide in a plane substantially coincidental with that of the front wall, angularly related reflectors within the body adjacent the rear wall and visible through said eye openings, and illuminating means including, a reflector at the outer side of the mounting and directing light through the slide in the mounting and to the reflectors, a lamp located in the space between the reflector and mounting, a socket carried by the body supporting the lamp in said space and having a lamp carrying case and a center contact, two spaced batteries carried by the body between the top and bottom walls and adjacent the front wall, a bus bar between the batteries, a lead from one battery to the case of the socket, a second lead from the contact to a point adjacent the other battery, and a push button accessible from the exterior of the body operable to move the second lead into contact with said other battery.

CECIL A. ROBERTSON.

REFERENCES CITED

The following references are of record in the file of this patent:

UNITED STATES PATENTS

| Number | Name | Date |
|---|---|---|
| 749,046 | Folmer et al. | Jan. 5, 1904 |
| 1,363,249 | Hallett | Dec. 28, 1920 |
| 1,440,231 | Miller | Dec. 26, 1922 |
| 1,083,313 | Cardoza | June 8, 1937 |
| 2,104,778 | Talley | Jan. 11, 1938 |
| 2,297,322 | Rasco | Sept. 29, 1942 |
| 2,336,288 | Peterson | Dec. 7, 1943 |

FOREIGN PATENTS

| Number | Country | Date |
|---|---|---|
| 20,972 | Great Britain | Dec. 23, 1890 |
| 20,095 | Great Britain | Oct. 20, 1894 |
| 875,974 | France | July 13, 1942 |